Dec. 30, 1969 — T. J. MOTTER — 3,486,918
STRIPPABLE PROTECTIVE GLASS COATING
Filed Nov. 2, 1966

INVENTOR.
Theodore J. Motter
BY Nobbe & Collins
ATTORNEYS

United States Patent Office 3,486,918
Patented Dec. 30, 1969

3,486,918
STRIPPABLE PROTECTIVE GLASS COATING
Theodore J. Motter, Genoa, Ohio, assignor to Libbey-Owens-Ford Company, a corporation of Ohio
Filed Nov. 2, 1966, Ser. No. 591,520
Int. Cl. C03c 21/00, 17/06; C23b 7/08
U.S. Cl. 117—6                                    7 Claims

ABSTRACT OF THE DISCLOSURE

Protecting sheet glass as it is being produced from subsequent staining, weathering and scratching, by applying an aqueous solution of a maleic-anhydride copolymer to form a skin-tight, transparent, readily removable coating.

---

Figures 1, 2:
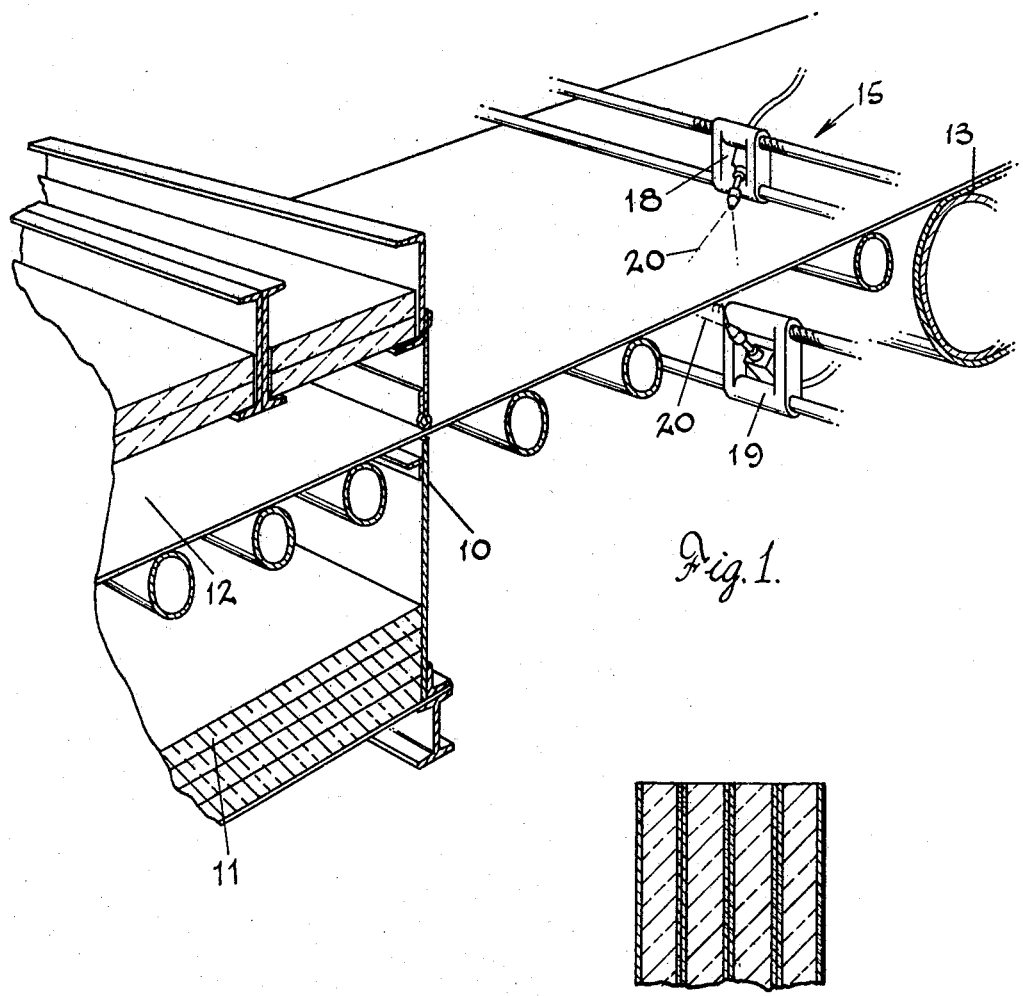

The present invention relates to the protection of surfaces, and more particularly to an improved coating and technique for protecting the surfaces of newly fabricated glass sheets or plates from staining, weathering, and/or scratching, under various storage and handling conditions.

Most commercial sheet and plate glasses are soda-lime-silica glasses and considerable difficulty has been experienced in the past because of the tendency of such glass to "weather" and "stain," particularly after it has been stored for any length of time under conditions that are less than ideal as to humidity, temperature, etc.

This is due to the presence of an alkaline film on the surface of the glass. Such a film has a great affinity for moisture, causing it to combine with water in the air to form a strong alkaline solution which solution has a corroding action on the sheet surfaces and causes them to "weather." That is, to fade and lose their highly polished lustre. The solution also causes "staining" of the glass, and this usually results when the glass plates or sheet have to be stored for any length of time under ordinary industrial storage conditions.

The alkaline surface film itself may develop in different ways. For example, when soda-lime-silica glasses are heated they develop or "sweat out" a thin but strongly alkaline film on their surfaces. Consequently, this sort of film develops on glass during the annealing process and for this reason, unless it is removed or neutralized, it will be present on a newly formed glass sheet or ribbon when such a sheet or ribbon emerges from the annealing lehr and is ready to be cut up into sheets or panes.

Even when the surface of a glass sheet is made neutral by washing, acid treating, or by grinding and polishing with acid in the polishing material, a thin film of moisture in contact with such a glass surface over a period of time (a common cause is sweating of the glass) brings out the alkali in the glass and will eventually cause staining.

In the past, a great deal of effort has been expended in an effort to effectively prevent weathering and staining of the glass and to protect it while in storage. For example, in the commercial production of sheet and plate glass, water and acid washing devices have been made a part of the standard equipment for the purpose of removing and/or neutralizing the alkaline film, and the washed glass sheets or plates have been packed or stored with sheets of special absorbent paper between their adjacent surfaces.

Such treatment, however, involves considerable expense, and is both time, space and labor consuming. Moreover, it is effective only when the glass is not stored for any great period because, even after thorough washing with water and acid, or in the case of plate glass polishing with acid in the rouge, and protection with paper, glass in storage will "stain."

It is, therefore, an aim of the present invention to provide a different method of protecting glass sheets from stain, weathering and scratches, and which will eliminate the necessity for washing, acid dipping and the use of paper or similar loose protective packing means.

Briefly stated, this purpose is accomplished in accordance with the invention by coating at least one and preferably both sides of the glass sheets with a skin-tight protective coating of a hydrophilic resinous copolymer.

Another object is the provision of a coating of the above character that is long-lived and gives adequate protection, while at the same time being inert to the glass and readily removable therefrom when it has served its purpose.

Another object is to provide such a protective coating that can be easily applied, that dries quickly, is sufficiently transparent to permit inspection of the glass, which does not interfere with edge grinding or the cutting of the glass into smaller plates or panes, to which cutting chips do not adhere and which itself does not adhere to similar coatings on other sheets even under conditions of high humidity.

Other objects and advantages of the invention will become more apparent during the course of the following description, when taken in connection with the accompanying drawings.

In the drawings, wherein like numerals are employed to desigate like parts throughout the same:

FIG. 1 is a longitudinal, sectional perspective view showing one way in which the coating of the invention may be applied to opposite surfaces of a ribbon of window glass as it emerges from an annealing lehr; and FIG. 2 is a fragmentary sectional view throuhg a stack of glass sheets provided with the coating of the invention.

Practically all present-day commercial sheet or window glass is flat drawn into a continuous ribbon, which is then passed into and through an annealing lehr within which the temperature of the glass is reduced to a point at which it can be readily handled. After leaving the lehr the ribbon of glass passes into a capping area where it is cut into sections that are subsequently divided into sheets or panes of commercial size.

Referring now more particularly to the drawings, there is shown in FIG. 1 the exit end 10 of an annealing lehr 11 through which a continuous ribbon of glass 12 is constantly moving. From the exit end of the lehr the ribbon 12 passes onto a capping table 13 which is provided with suitable equipment (not shown) for scoring and breaking the ribbon into sections or blanks of predetermined size.

According to the present invention, the clean pristine surface of such a ribbon can be provided with an enduring, transparent and adequately protective coating, before the glass ribbon reaches the capping area.

A preferred way of accomplishing this is shown in FIG. 1 where there is interposed, between the exit end of a lehr 11 and a capping table 13, a spray applying apparatus 15. The spray mechanism 15 may comprise suitable reciprocating atomizers 18 and 19 for directing sprays of coating solution 20 upon opposite surfaces of the advancing ribbon 12. The amount of coating sprayed on the glass and consequently the thickness of coating can be controlled by regulating the amount of solution being sprayed and the speed of travel of the atomizers but of course other conventional means of applying the solution and of controlling the coating thickness can be used if desired.

The glass ribbon 12 as it emerges from the lehr is usually at a temperature ranging from 150° to 250° F., depending on the thickness of the ribbon and the particular conditions under which it has been formed and annealed. Ordinarily, at this time the newly formed ribbon is prefectly clean and, where this is the case, the clean glass is immediately sprayed with the coating solution which, upon drying, serves to maintain the sprayed surfaces in their original state during subsequent operations and until the glass is ready to be sold or used.

In its broad concept the coating solution of the invention is a dilute aqueous solution of a material selected from a group of natural, modified natural and synthetic products of a resinous nature which are solubilized in water by the aid of agents such as dilute acids or alkalis, and which produce a clear film when sprayed on hot glass.

An example of an acid soluble resinous product of this character is the acrylic copolymer produced and sold by Polyvinyl Chemicals as "Neocryl A–140."

However, the most promising materials tested to date are crosslinked ethylene-maleic-anhydride copolymers having a viscosity in a 1% solution of from 12,000 to 160,000 centipoises at a pH of about 9. The structural formula of these resin copolymers is:

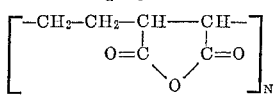

They are employed as dilute alkaline aqueous solutions and those of the higher molecular weights are preferred.

Thus, a coating solution according to the invention, can be made up with any of these copolymers that have viscosites between 12,000 and 160,000 centipoises in the following proportions:

Resin copolymer _____ grams__ 0.25 to 3.0
Water _____ ml__ 500
Alkaline agent _____ grams__ 0.5 to 10

And, to give two specific examples, the resin copolymers with viscosities of 80,0000 and 160,000 centipoises respectively, give excellent results and, when dissolved in the proportions of 1 gram of the resin to 500 ml. of water and 2 grams of an alkaline agent such as concentrated ammonium hydroxide result in a solution of about the maximum thickness that can be easily sprayed. The latter resin in solution when sprayed on glass at around 250° F. gives a smooth, transparent film that is practically as clear as the glass itself, while a solution of the former resin produces a comparable film, with better moisture resistance, that is only slightly less clear. Both of these solutions, probably because of the resin's affinity for and outstanding power to hold water, appear to act as their own plasticizers, permitting excellent flow-out even when sprayed on heated glass; and the fact that the resins require an alkaline agent as well as water for solubilization, results in the sprayed films being unharmed by atmospheric conditions of high humidity.

The lubricity and scratch resistance of these films is greatly improved by the addition of a compatible lubricant such as the high molecular weight polyethylene glycol compound sold by Union Carbide and Chemical Company as "Carbowax 20M" and an amount of around 1 gram of this in the above formulation gives good results. Amounts of lubricant between 0.25 and 5.0 grams can be used and, while slightly increasing haze, will still give a film that is adequately transparent. The specific polyethylene glycol compound mentioned is the highest member of a series of compounds that range in molecular weight from 200 to 20,000 and itself is in the 15,000 to 20,000 range.

To permit exhaustive tests of the efficiency of the films of the invention, upwards of 1,000 square feet of sheet glass was sprayed with the ethylene-maleic-anhydride copolymer having a viscosity of 80,000 centipoises in a 1% solution. The spray solution was prepared in 55 gallon lots by:

(1) Putting 55 gallons of distilled (or deionized) water in a large mixing kettle and warming to 140° F.;
(2) Adding 416 grams of the resin and dispersing with good agitation;
(3) Adding 416 grams of Carbowax-polyethylene-glycol compound 20M;
(4) Adding 832 ml. of concentrated $NH_4OH$;
(5) Stirring vigorously for 2 hours and then allowing to stand overnight.

When this solution was pumped into an epoxy-lined steel drum it was essentially clear, had a viscosity similar to SAE–20 motor oil and a solid content of 0.4%.

In the tests, the resin solution was sprayed with a De Vilbiss MBC spray gun equipped with an E tip and needle at 50 p.s.i. with a needle setting of 2 to 3 turns open and a reciprocating speed of 40 to 50 feet per minute to coat double strength glass at 250° F. but, importantly, the spray conditions were adjusted to apply approximately 6 ml. of solution per square foot of glass within a variation of about 1 ml.

The resulant films were tightly adherent and remained in place even after 10 minutes exposure in a steam autoclave at 7 p.s.i.; they softened upon exposure to 100% relative humidity at room temperature but did not become sticky; and they were removable upon mild rubbing with water. The material cost for the coating was approximately 0.006¢ per square foot as against a cost for paper alone in the prior art protection technique of from 25 to 50 times greater.

The glass coated as above described was then cut into 24" x 24" sheets, boxed in 50 foot boxes and a representative number of boxes stored for periods of from 3 months to 1 year:

(1) Under normal glass storage conditions.
(2) Under abnormally poor storage conditions.
(3) At 70° F. and 50% relative humidity.
(4) In an area of high humidity and fluctuating temperature.

Other boxes were given an accelerated oven test and others were vibrated, before and after storing, at 70 r.p.m. for two hours which is equivalent to 1,000 miles of rail shipment.

All the glass was then examined to evaluate the coatings and it was found that:

(1) Scratches resulting from normal handling were well within acceptable tolerances as were scratches resulting from the vibration test;
(2) None of the coated glass was stuck together;
(3) There was no staining or weathering that was not removable by washing;
(4) The coating resisted light rinsing with water, but no difficulty was encountered in removing it by running the glass through a conventional type of brush and water washing machine;
(5) The coated glass minimized the sticking of cutting chips to the glass;
(6) The coating and storing of the coated glass had no apparent effect on its being subsequently edge ground, silvered, laminated or glazed with coventional glazing compounds.

As indicated above, the coating of the invention is transparent, tightly adherent to the glass, and yet readily removable. Because of this, the coated glass can be handled, examined and cut in the same way as uncoated glass while, at the same time, being fully protected against weathering, staining and scratching. The coating may be left in place as long as it appears desirable to do so and, in some cases it may be practicable to leave it in place until after the glass has been at least partially processed or has actually been installed in an opening to be glazed. In any event, whenever it is desired to remove the coating, this can be done by simply washing and rubbing or brushing with water.

While the invention has been specifically described in connection with the coating of a continuous glass ribbon

I claim:
1. A method of protecting glass sheets from stain, weathering and scratches during subsequent handling, storing and processing which comprises applying to said sheets a dilute alkaline aqueous solution of a cross-linked ethylene-maleic anhydride copolymer having a viscosity in a 1% solution of from 12,000 to 160,000 centipoises at a pH of approximately 9 and the following structural formula:

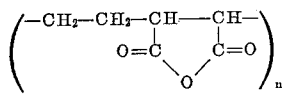

2. A method as defined in claim 1, in which essential ingredients thereof are present in approximately the following proportions:

| | | |
|---|---|---|
| Resin copolymer | grams__ | 0.25 to 3.0 |
| Water | ml__ | 500 |
| Alkaline agent | grams__ | 0.5 to 10.0 |

3. A method as defined in claim 2, in which said solution also includes from 0.25 to 5.0 grams of a compatible lubricant, and the viscosity of said copolymer is at least 80,000 centipoises.
4. A method as defined in claim 3, in which said lubricant is a polyethylene glycol compound having an atomic weight in the 15,000 to 20,000 range.
5. A method as defined in claim 4, in which the viscosity of said copolymer is 80,000 centipoises, and said solution is applied while said glass sheets are at a temperature between 150° and 250° F.
6. A method of protecting sheets capped from a newly formed and annealed ribbon of glass from stain, weathering and scratches during subsequent handling, storing and processing which comprises applying to said ribbon between the area in which it is annealed and the area in which it is capped and while it is still in a heated condition, a solution consisting essentially of a dilute alkaline aqueous solution of a crosslinked ethylene-maleic-anhydride copolymer having a viscosity in a 1% solution of at least 80,000 centipoises at a pH of approximately 9 and the following structural formula:

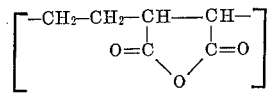

with a polyethylene glycol compound having an atomic weight in the 15,000 to 20,000 range as a lubricant, and with a essential ingredients present in the solution in approximately the following proportions:

| | | |
|---|---|---|
| Copolymer | grams__ | 0.25 to 3.0 |
| Water | ml__ | 500 |
| Alkaline agent | grams__ | 0.5 to 10.0 |
| Lubricant | do____ | 0.25 to 5.0 | at the rate of 5 to 7 ml. of solution per square foot of glass surface.
7. As a new article of manufacture, a glass sheet and a skin-tight, clear, transparent, removable coating of a high molecular weight crosslinked ethylene-maleic-anhydride copolymer having the following strutcural formula:

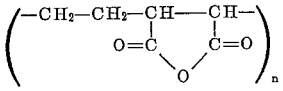

on at least one surface thereof.

References Cited

UNITED STATES PATENTS

| | | | |
|---|---|---|---|
| 3,393,168 | 7/1968 | Johnson | 117—161 |
| 3,202,523 | 8/1965 | Steeg | 117—6 |
| 3,018,195 | 1/1962 | Kelly et al. | 117—161 |
| 2,824,411 | 2/1958 | Goodwillie et al. | 117—6 |
| 2,540,996 | 2/1951 | Ryden | 117—6 |

RALPH S. KENDALL, Primary Examiner

A. GRIMALDI, Assistant Examiner

U.S. Cl. X.R.

117—124, 161; 260—29.6